(12) United States Patent
Strausbaugh

(10) Patent No.: US 11,420,549 B1
(45) Date of Patent: Aug. 23, 2022

(54) EXHAUST COMPONENT WITH ILLUMINATION

(71) Applicant: Michael John Strausbaugh, Lampasas, TX (US)

(72) Inventor: Michael John Strausbaugh, Lampasas, TX (US)

(73) Assignee: Michael John Strausbaugh, Lampasas, TX (US)

(*) Notice: Subject to any disclaimer, the term of this patent is extended or adjusted under 35 U.S.C. 154(b) by 0 days.

(21) Appl. No.: 17/300,779

(22) Filed: Nov. 5, 2021

(51) Int. Cl.
*B60Q 1/00* (2006.01)
*F01N 13/08* (2010.01)
*F21V 29/15* (2015.01)
*F21V 23/00* (2015.01)
*F21V 11/08* (2006.01)

(52) U.S. Cl.
CPC ........... *B60Q 1/0017* (2013.01); *F01N 13/08* (2013.01); *F21V 11/08* (2013.01); *F21V 23/003* (2013.01); *F21V 29/15* (2015.01)

(58) Field of Classification Search
CPC ....... B60Q 1/0017; F21V 29/15; F21V 11/08; F21V 23/003; F01N 13/08
USPC ........................................................ 362/253
See application file for complete search history.

(56) References Cited

U.S. PATENT DOCUMENTS

| | | |
|---|---|---|
| 5,036,248 A | 7/1991 | McEwan et al. |
| 5,036,947 A | 8/1991 | Metzger |
| 5,634,706 A | 6/1997 | Berry |
| 5,697,700 A | 12/1997 | Huang |
| 5,964,312 A | 10/1999 | Maldonado |
| 6,053,626 A | 4/2000 | Zagrodnik et al. |
| 6,126,303 A | 10/2000 | Gross |
| 6,247,830 B1 | 6/2001 | Winnett et al. |
| 6,471,377 B1 | 10/2002 | Stegall |
| 6,491,418 B1 | 12/2002 | Chen |
| 6,582,108 B1 * | 6/2003 | Liang .................... B60Q 1/2688 362/545 |
| 6,588,923 B1 * | 7/2003 | Shih ...................... B60Q 1/2688 362/248 |
| 6,655,823 B2 | 12/2003 | Chang |
| 6,663,269 B1 * | 12/2003 | Leu ....................... B60Q 1/2688 362/545 |
| 6,880,959 B2 | 4/2005 | Houstan |

(Continued)

OTHER PUBLICATIONS

Big Rig Chrome Shop 2020 Catalog, LED Flasher Control Module Part No. MX-M50910, p. 111.

(Continued)

*Primary Examiner* — Bryon T Gyllstrom

(57) ABSTRACT

One embodiment of exhaust component (30) contains a shield (40). The shield being opaque allows indefinite designs to be cut out. These designs are illuminated by illumination assembly (36), which enhances cutouts (44), thereby allowing them to remain visible under all conditions. Another embodiment of the exhaust component without the shield contains illumination modules (58). These modules illuminate the exhaust component's mouth (32) through base (22) or outer wall (34), and this allows the shape of the exhaust component to be the design feature. The illumination of the mouth both enhances the shape and allows it to remain visible under all conditions. These embodiments can occur alone or together for both maximal design enhancement and additional visibility of the vehicle thereby increasing safety.

20 Claims, 14 Drawing Sheets

(56) References Cited

U.S. PATENT DOCUMENTS

| | | | |
|---|---|---|---|
| 7,242,028 B2 | 7/2007 | Dry | |
| 7,905,642 B2 | 3/2011 | Sindelar | |
| 9,464,776 B2 | 10/2016 | Salter et al. | |
| 2003/0231506 A1* | 12/2003 | Chen .................... | B60Q 1/2688 362/546 |
| 2004/0042224 A1* | 3/2004 | Chen ....................... | F01N 13/00 362/487 |
| 2005/0056482 A1 | 3/2005 | Tsai | |
| 2015/0138810 A1* | 5/2015 | Salter ................... | B60Q 1/2688 362/510 |

OTHER PUBLICATIONS

Big Rig Chrome Shop 2020 Catalog, Strobe Flasher Module Part No. TX-TU-1007, p. 111.
Big Rig Chrome Shop 2020 Catalog, 48" Exhaust Muffler Shield Plain Style, Part No. UP21242, p. 168.
Big Rig Chrome Shop 2020 Catalog, 48" Exhaust Muffler Shield Round Style, Part No. UP21244, p. 168.
Big Rig Chrome Shop 2020 Catalog, 48" Exhaust Muffler Shield Horizontal Style, Part No. UP21246, p. 168.
Big Rig Chrome Shop 2020 Catalog, 48" Exhaust Muffler Shield Vertical Style, Part No. UP21248, p. 168.

* cited by examiner

EXHAUST COMPONENT WITH ILLUMINATION

CROSS-REFERENCE TO RELATED APPLICATIONS

This application claims the benefit of provisional patent application Ser. No. 63/205,238 filed 2020 Nov. 27 by the present inventor.

BACKGROUND

Prior Art

The following is a tabulation of some prior art that presently appears relevant:

U.S. Patents

| Pat. No. | Kind Code | Issue Date | Patentee |
| --- | --- | --- | --- |
| 5,036,947 | — | 1991 Aug. 6 | Metzger |
| 5,634,706 | — | 1997 Jun. 3 | Barry |
| 6,247,830 | B1 | 2001 Jun. 19 | Winnett et al. |
| 6,471,377 | B1 | 2002 Oct. 29 | Stegall |
| 6,491,418 | B1 | 2002 Dec. 10 | Chen |
| 6,588,923 | B1 | 2003 Jul. 8 | Shih |
| 6,655,823 | B2 | 2003 Dec. 2 | Chang |
| 6,663,269 | B1 | 2003 Dec. 12 | Leu |
| 7,905,642 | B2 | 2011 Mar. 15 | Sindelar |

U.S. Patent Application Publication

| Publication Nr. | Kind Code | Pub. Dt | Applicant |
| --- | --- | --- | --- |
| 2005/0056482 | A1 | 2005 Mar. 17 | Tsai |

Background

Originally, exhaust stacks and tips were merely functional, providing an exit point for exhaust gases produced by an engine. The stacks or tips would often become very hot. When heat was an issue, shields were installed to keep the hot stack or tip from being touched.

Over time, in addition to the functional aspect, manufacturers began designing stacks and tips that were more aesthetically pleasing. Manufacturers applied coatings of different colors and consistencies. Sometimes they added decorative features, such as different shapes to the stacks or tips, or various designs or lettering were cut out of the shields. Although stacks and tips can be both functional and decorative, I noticed that the aesthetics were literally lost in the dark and they could not be seen under all conditions.

A number of exhaust components have light emitting features which are of limited aesthetic design. Some suffer from operability issues due to the lights' proximate placement to a heat source.

U.S. Pat. No. 6,663,269 B1 to LEU (2003) and U.S. Pat. No. 6,588,923 B1 to SHIH (2003) divert exhaust flow to allow lights to be where exhaust would normally exit. However, these light features are limited by the arrangement of the lights themselves. U.S. Pat. No. 6,471,377 B1 to STEGALL (2002), U.S. Pat. No. 6,491,418 B1 to CHEN (2002), and U.S. Pat. No. 6,655,823 B2 to CHANG (2003) use double pipe designs. Each mount the lights between the inner and outer pipes. Yet, these light features are limited to a glow in the form of a ring visible only from the discharge area of the pipes. U.S. Pat. No. 7,905,642 B2 to SINDELAR (2011) presents an exhaust stack with an array of cylindrical lights in the outer casing. Notwithstanding, the light feature is limited to the vertical arrangement of lights. Pub. Nr. U.S. 2005/0056482 A1 to TSAI (2005) presents an exhaust component having external fittings as design features being illuminated by lights extending from the side face. Howbeit, the positioning of those lights would create shadows obscuring the design features since the light is cast across the design from only one side.

Some uses of lights to illuminate design features on known exhaust components pose operability issues due to the high heat associated with exhaust gases. LEU, CHEN, CHANG, and SINDELAR all require insulation to combat heat which comes with an increased manufacturing cost. STEGALL, CHEN, CHANG, and SINDELAR each employ a double pipe design encasing the hot exhaust pipe inside a secondary pipe. Nonetheless, STEGALL, CHEN, and CHANG place the light source between those pipes. CHEN and CHANG both propose a form of holes in the outer pipe. Nevertheless, they do not propose using such holes to aid in the operability of the lights positioned between the inner and outer pipes. CHEN only teaches that holes through the wall will allow light to shine out. And CHANG mentions radiation openings to improve heat radiating effect without any other stated purpose. None of these inventions suggests projecting light from an outside source through holes in the base or the outer wall of the exhaust component to address inoperability due to heat.

Furthermore, none of the inventions suggest projecting light from an outside source through holes in the base or outer wall of the exhaust component to fully illuminate the mouth of that component. In fact STEGALL, CHEN, and CHANG teach that the inner pipe protrudes past the outer pipe or ends almost congruently. Consequently, the lights will cause illumination of only the gap between the inner and outer pipes. None of the inventions suggest shortening the inner pipe enough to allow full illumination of the exhaust component's mouth.

STEGALL, CHEN, and CHANG teach that the exhaust component's exit shape forms the shape of the design feature into a ring. LEU mentions a cap with lights which forms its design feature. The drawings in LEU show the shape of the design feature as a circle. SHIN proposes lights in corresponding grooves. Finally, neither SINDELAR nor TSAI claim any particular shape as a design feature. SINDELAR proposes a vertical array of lights and TSAI an exhaust fitting which is side lit. None of the prior art suggests using the shape of the outer pipe other than circular as an illuminated design feature.

No prior art suggests using a combination of heat shield, illuminated designs, and hot exhaust component. Both U.S. Pat. No. 6,247,830 B1 to WINNETT et al. (2001) and U.S. Pat. No. 5,036,947 to METZGER (1991) show heat shields. WINNETT et al. discloses an agricultural light with a shield. However, the shield is merely intended to reflect light toward a desired area. METZGER discloses a shield which is intended to protect a user from coming in contact with a hot exhaust component. Neither suggests cutting a design feature in the shield itself. U.S. Pat. No. 5,634,706 to BARRY (1997) discloses an illuminated gas tank shell. It suggests that the shell may contain panels with designs cut out that can be illuminated. Nevertheless, there is neither an express nor implicit suggestion to use WINNETT et al., METZGER, and/or BARRY in combination with each other nor in combination with any of LEU, SHIH, STEGALL, CHEN, CHANG, SINDELAR and/or TSAI.

Exhaust component prior art does not suggest using multifunction controllers in combination to control the illumination. LEU and CHEN both suggest a wired controller device of limited functionality. LEU describes an integrated circuit or timer to light the illuminator in a sequential pattern or randomly. CHEN describes a controller device to turn the illuminating device on and off in sequence or irregular patterns. No prior art shows an illumination controlling system in combination with an exhaust component allowing for the adjustment of the hue, value, saturation, tint, tone, shade, and intensity, in addition to the creation of custom patterns by wire or wirelessly.

SUMMARY

An improved exhaust component that has design features and an illumination assembly or module that allow users to illuminate the design features in accordance with one or more aspects of the embodiment.

ADVANTAGES

Accordingly, advantages of one or more aspects are to provide illumination of the exhaust component's design features allowing enhancement and visibility of those features under all conditions. Additionally, extra illumination increases safety because the vehicle remains visible under all conditions. Still, further advantages will become apparent from the study of the following description and accompanying drawings.

DRAWINGS—FIGURES

Figure 14:
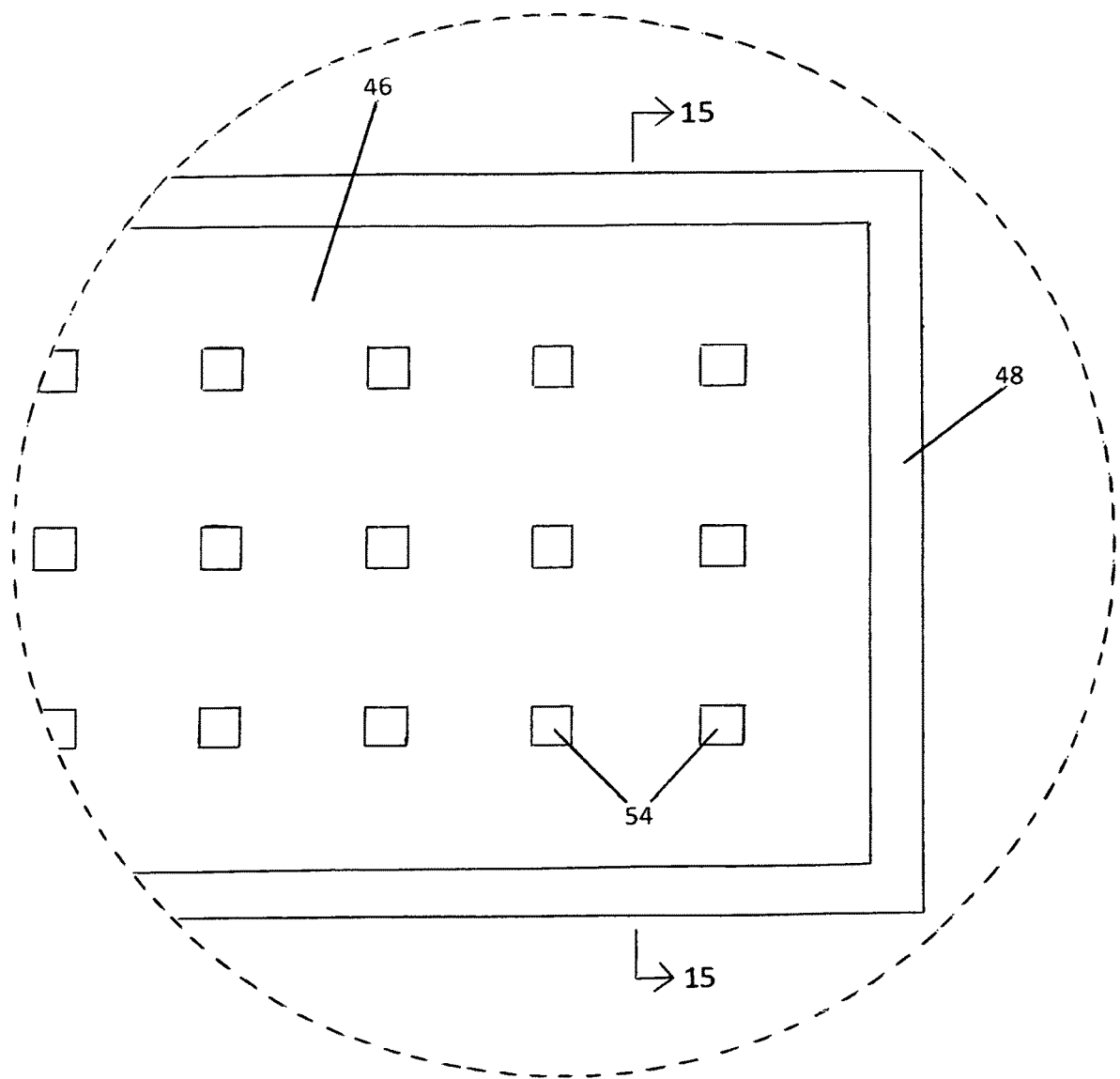
FIG. 14 is an enlarged view of the portion indicated in FIG. 13A.
Figure 15:
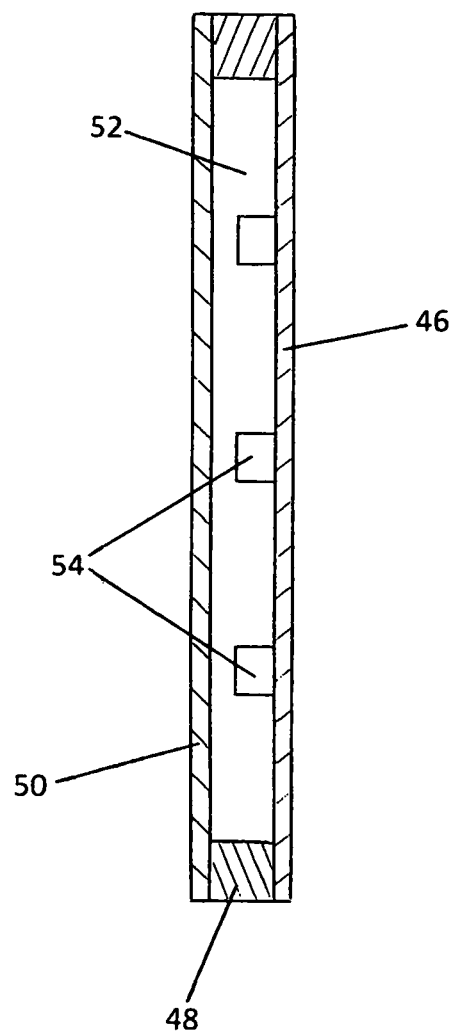

FIG. 15. is a sectional plane view of the portion indicated by section lines 15-15 in FIG. 14.

| DRAWINGS - REFERENCE NUMERALS | |
|---|---|
| 20 Exhaust inlet | 22 Base |
| 24 Inlet Holes | 26 Inner Wall |
| 28 Inner Wall Assembly | 30 Exhaust Component |
| 32 Mouth | 34 Outer wall |
| 36 Illumination Assembly | 38 Electrical Wire and Plug |
| 40 Shield | 42 Mounting Tab |
| 44 Cutout | 46 Backplate |
| 48 Frame | 50 Cover |
| 52 Cavity | 54 Illuminator |
| 56 Spacer | 58 Illumination Module |
| 60 Suspender | 62 Module Base |
| 64 Bezel | |

DETAILED DESCRIPTION—FIGS. 1 THROUGH 6—FIRST EMBODIMENT

Figure 1:
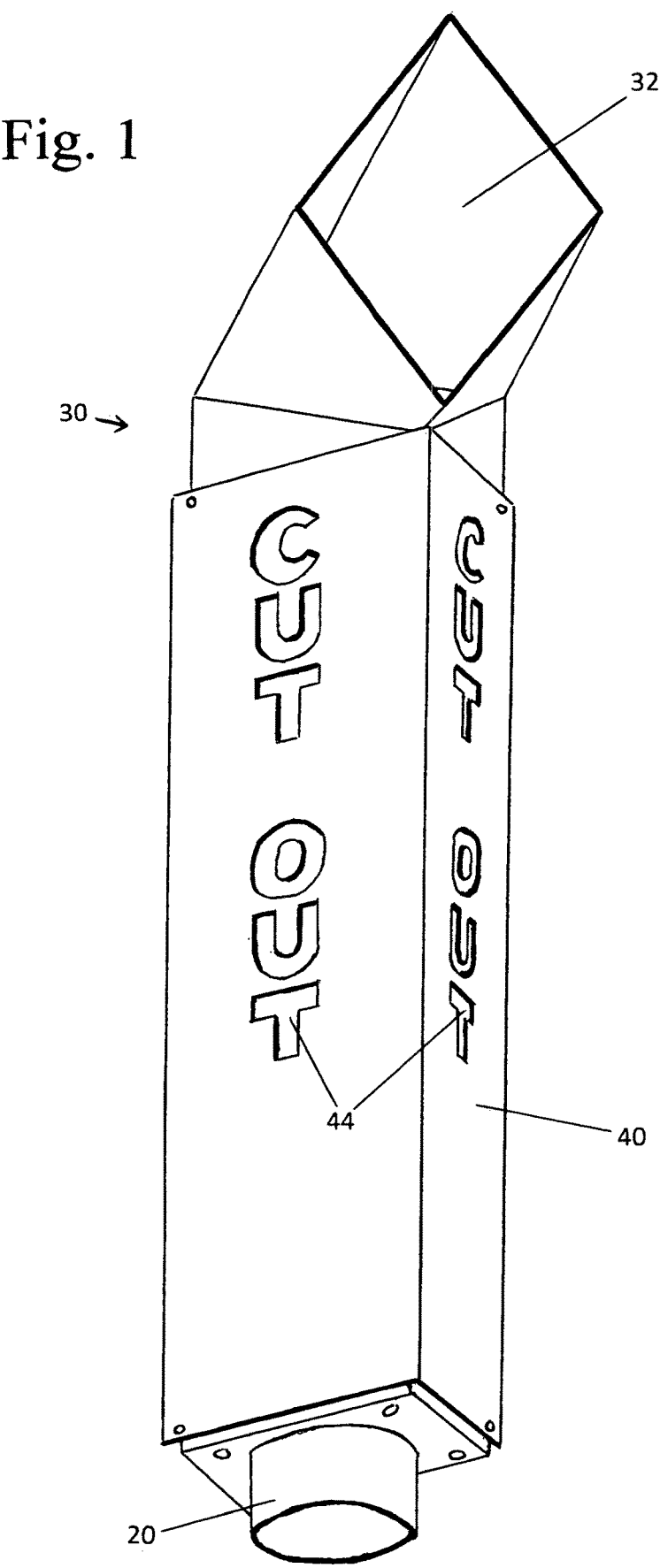
FIG. 1 is a perspective left-side and bottom view of an embodiment.

FIG. 1 is a perspective view from the user's left-side with the bottom visible and constructed in accordance with an embodiment. The embodiment of FIG. 1 is an exhaust component 30 with a shield 40 that has cutouts 44. The exhaust component may have a diamond cross section of nine inches by eight inches and be thirty-six inches long and made of mild steel that is powder coated. However, the exhaust component can have different cross sections, such as oval, circular, triangular, square, rectangular, pentagonal, hexagonal, octagonal, etc. The exhaust component can have different mouth 32 angles, such as 30°, 60°, 90°, 180,° etc., different sizes, and be made of different materials, such as carbon steel, stainless steel, aluminum, polycarbonate, fiberglass, Kevlar, carbon fiber, etc. The exhaust component can also have different finishes, such as high-temperature paint, chrome, polished, etc.

Shield 40 conforms to the shape of exhaust component 30 and may cover any portion of the component, such as the front half, sides, circumference, etc., and can be of the same or different material, and finish. Cutout 44 can be designs, such as letters, logos, symbols, pictures, etc.

Figure 2A:
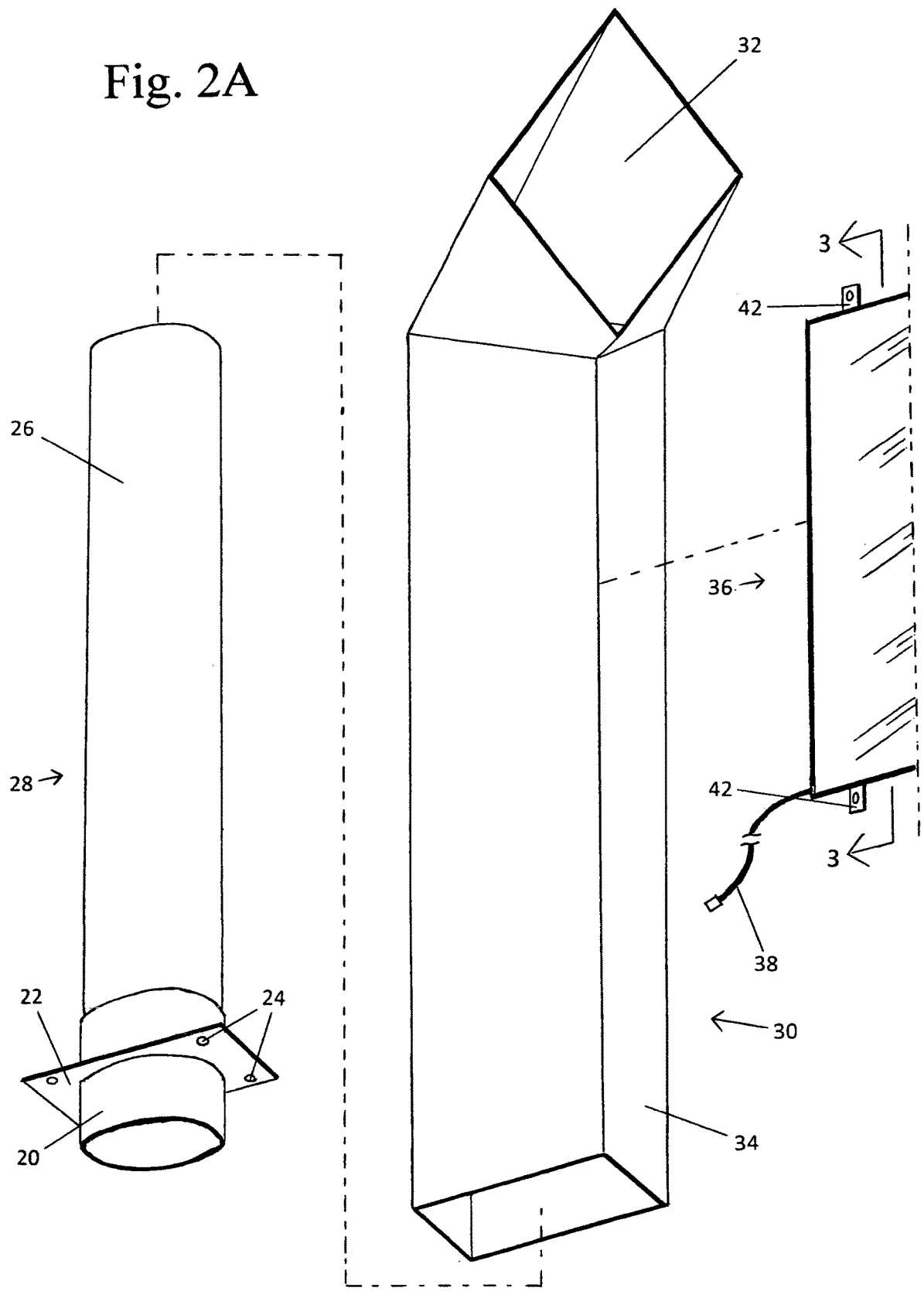
FIGS. 2A and 2B are exploded perspective left-side and bottom views of the embodiment in FIG. 1.
Figure 2B:
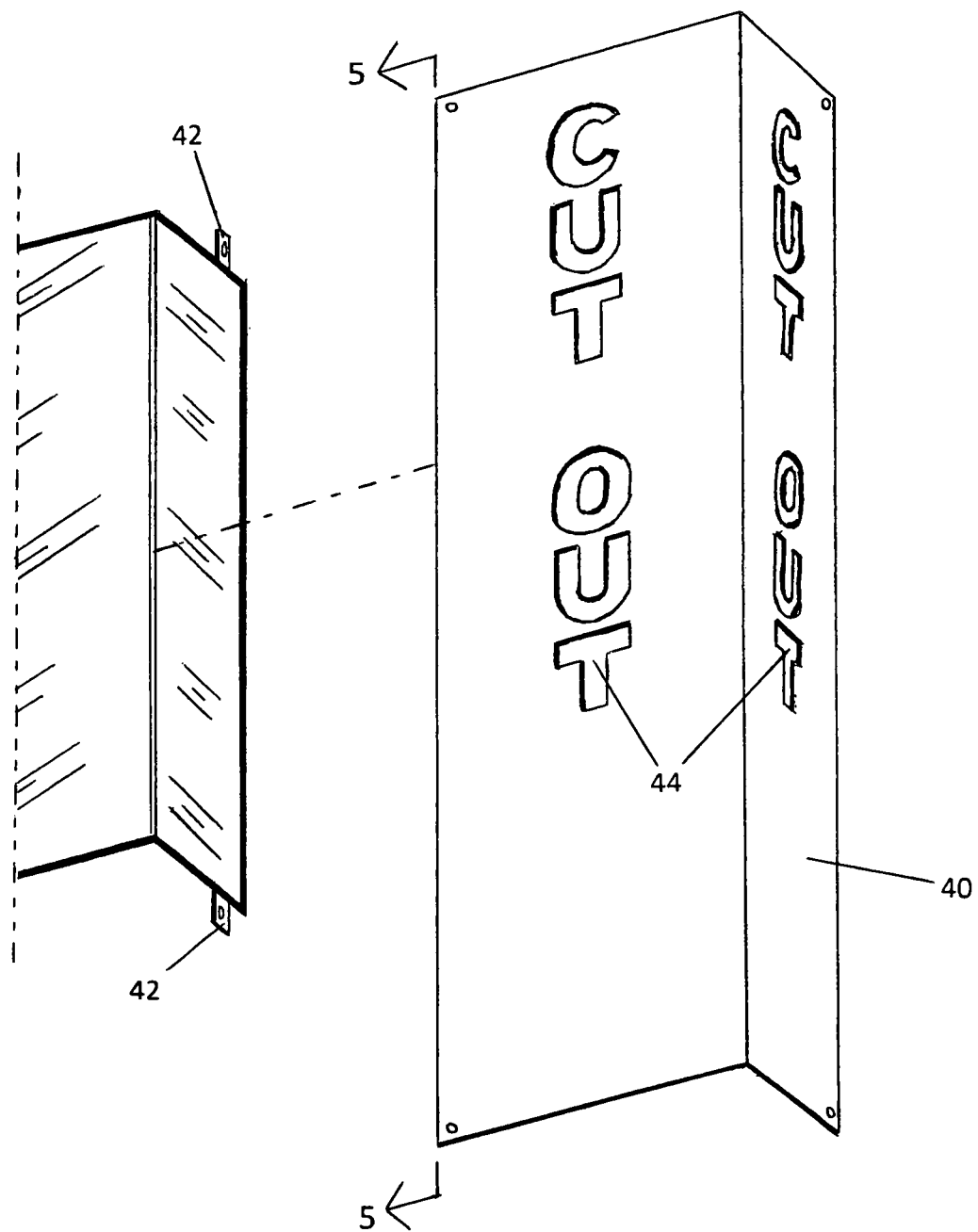

FIGS. 2A and 2B are exploded perspective left-side and bottom views of the embodiment in FIG. 1. The embodiment has an exhaust inlet 20 protruding through a base 22 that has inlet holes 24. The exhaust inlet is affixed to the base. An inner wall 26 is inserted into the upper portion of the exhaust inlet and affixed, completing an inner wall assembly 28. The inner wall assembly is inserted into the bottom of outer wall 34, stopping short of mouth 32 when base 22 contacts the bottom of the outer wall (to which it is affixed).

The embodiment also has an illumination assembly 36 with one or more illuminator(s) 54, and has an electrical wire and plug 38. The illumination assembly is attached, via mounting tabs 42, to the back of shield 40 which has cutouts 44. The shield (with illumination assembly) is attached to the outer walls of the exhaust component. The illuminators may be controlled by a multifunction controller (not shown). The controller may have the capability of receiving signals from the vehicle, such as turn signals, brake lights, running lights and by wire or wirelessly pass on the signal(s) to the illumination assembly. The controller may also be used, by wire or wirelessly, to adjust among others: the hue, value, saturation, tint, tone, shade, and intensity of the illuminators, in addition to the creation of custom patterns.

Figure 3:
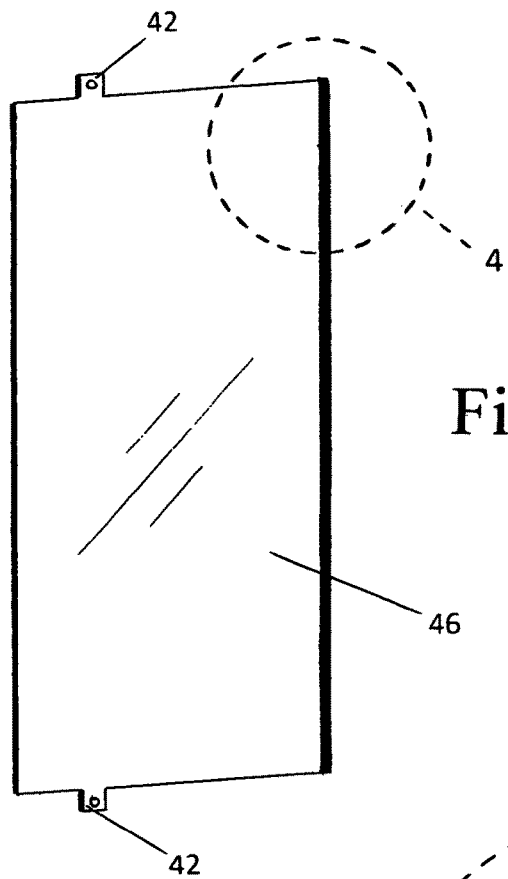
FIG. 3 is a full left-side view of the sectional plane that is indicated by section lines 3-3 in FIG. 2A.

FIG. 3 is a full left-side sectional view of illumination assembly 36 (FIGS. 2A & 2B) indicated by section lines 3-3. Also visible is a backplate 46 with mounting tabs 42.

Figure 4:
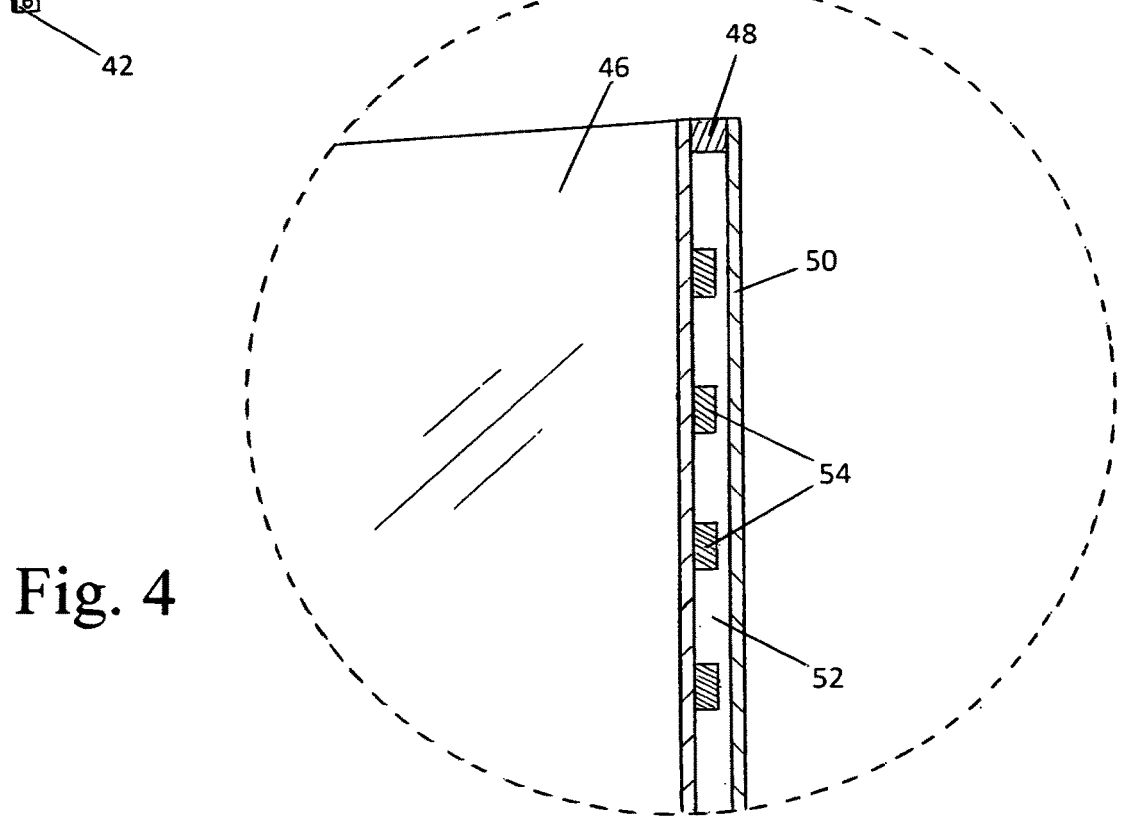
FIG. 4 is an enlarged cross-sectional view of the portion indicated in FIG. 3.

FIG. 4 is an enlarged cross-sectional view of the portion of the sectional plane indicated in FIG. 3. The enlarged portion of illumination assembly 36 shows backplate 46 affixed to the back of frame 48 which has the effect of encasing the backplate's perimeter. A cover 50 is affixed to the front of the frame, creating a cavity 52 which contains illuminators 54.

Figure 5:
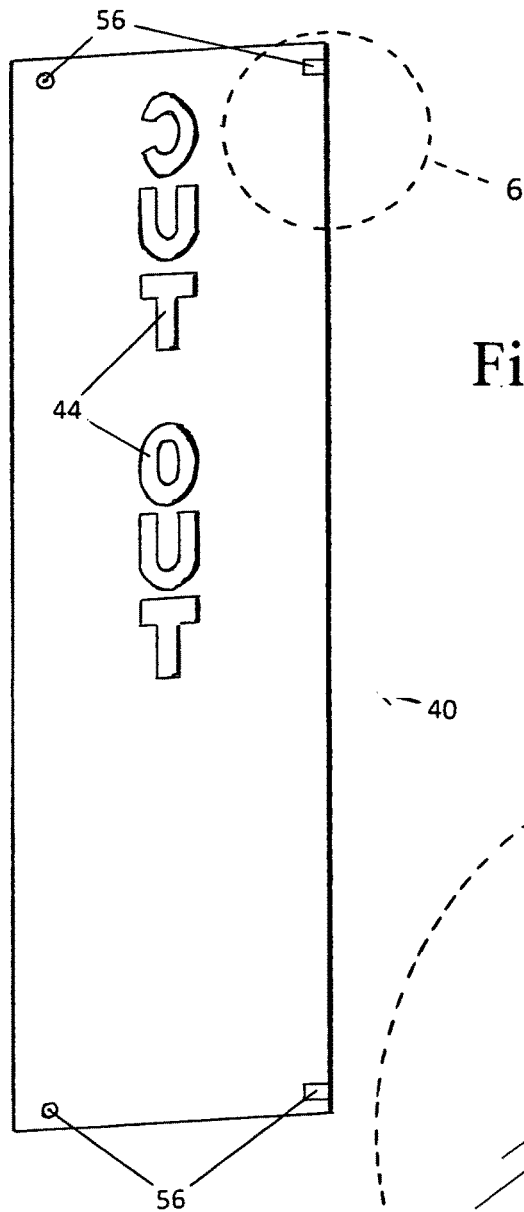
FIG. 5 is a full left-side view of the sectional plane that is indicated by section lines 5-5 in FIG. 2B.

FIG. 5 is a full sectional plane view of the left-side of shield 40 (FIG. 2B) indicated by sectional lines 5-5. Also visible is the shield's back with cutouts 44 and spacers 56.

Figure 6:
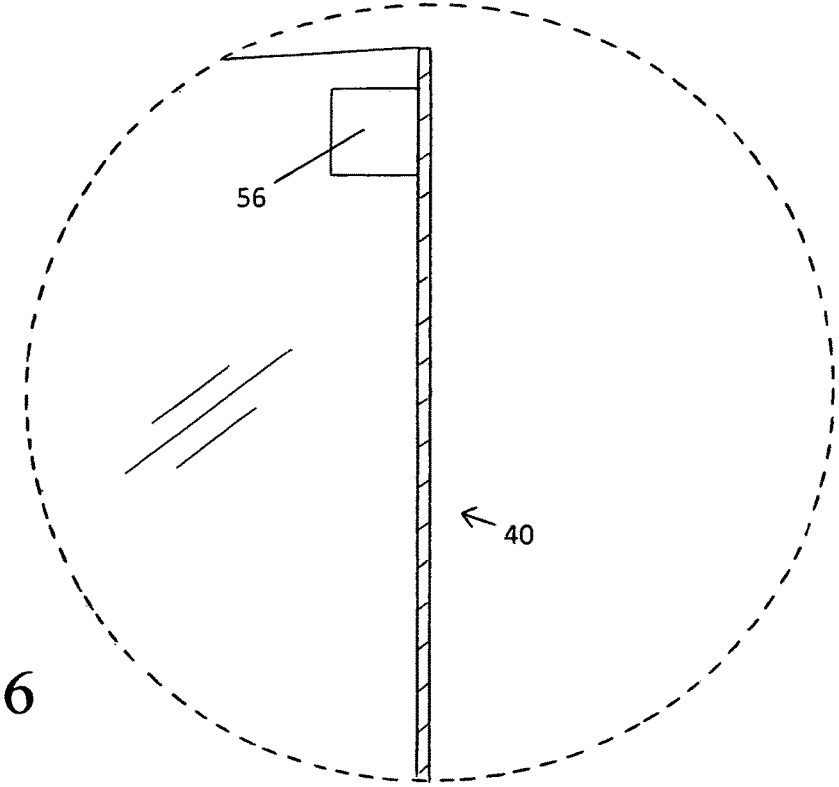
FIG. 6 is an enlarged cross-sectional view of the portion indicated in FIG. 5.

FIG. 6. is an enlarged cross-sectional view of a portion of the left-side sectional plane indicated in FIG. 5. The enlarged portion of shield 40 shows a close-up view of one spacer 56.

OPERATION—FIGS. 1 THROUGH 6

The embodiment shown in FIG. 1 is exhaust component 30 with illumination assembly 36 mounted behind shield 40 (FIGS. 2A & 2B) and it would be used as a terminal component of an exhaust system of an internal combustion engine (not shown). A user would install the exhaust component onto the end of an existing pipe (not shown) via exhaust inlet 20 (FIG. 1).

Heated exhaust gas traveling from the engine's exhaust system (not shown) enters exhaust component 30 via exhaust inlet 20 and then travels through inner wall 26 which terminates short of mouth 32. As the heated exhaust gas exits through the mouth it creates a draft. The draft draws ambient air through base 22 via inlet holes 24. The ambient air travels between the inner wall and outer wall 34, mixing with the exhaust gas in the latter portion of the exhaust component and then exiting from the mouth. The action of drawing ambient air into the exhaust component cools the outer wall and allows illumination assembly 36 to function within close proximity of the exhaust component. Drawing ambient air into the exhaust stream also has the added effect of cooling the exhaust gasses before exiting the exhaust component. Exhaust component 30 can also operate without the inner wall and the inlet hole if a heat resistant coating, such as ceramic (not shown) is applied to backplate 46 to minimize heat transfer to the illumination assembly.

Illumination assembly 36 receives power via the vehicle's electrical system (not shown) which is connected to electrical wire and plug 38. Illuminators 54 fill cavity 52 with light. Backplate 46 and frame 48 are opaque, thereby forcing the light to shine through cover 50 (FIGS. 2A, 2B, & 4).

Illumination assembly 36 is mounted against the back of shield 40 (which is also opaque). Indefinite designs may be cut out of the shield and are illuminated via the illumination assembly (FIGS. 2A & 2B). As light shines through cover 50 (FIG. 5), it illuminates cutouts 44 (FIG. 2B).

Shield 40 and attached illumination assembly 36 are mounted to outer wall 34 of exhaust component 30 (FIG. 1). Spacers 56 (FIGS. 5 & 6) are used when mounting the shield to the component. The spacer both ensures that backplate 46 of the illumination assembly does not contact the outer wall, and allow for an air gap to aid in limiting heat transfer from the exhaust component to the illumination assembly.

Thus, unlike prior exhaust stacks and tips, cutouts 44 in shield 40 are enhanced by illumination which also allows them to remain visible under all conditions. Additionally, illumination of the shield's cutouts increase safety by making the vehicle more visible under all conditions.

FIGS. 7 THROUGH 11—ADDITIONAL EMBODIMENT

Figure 7:
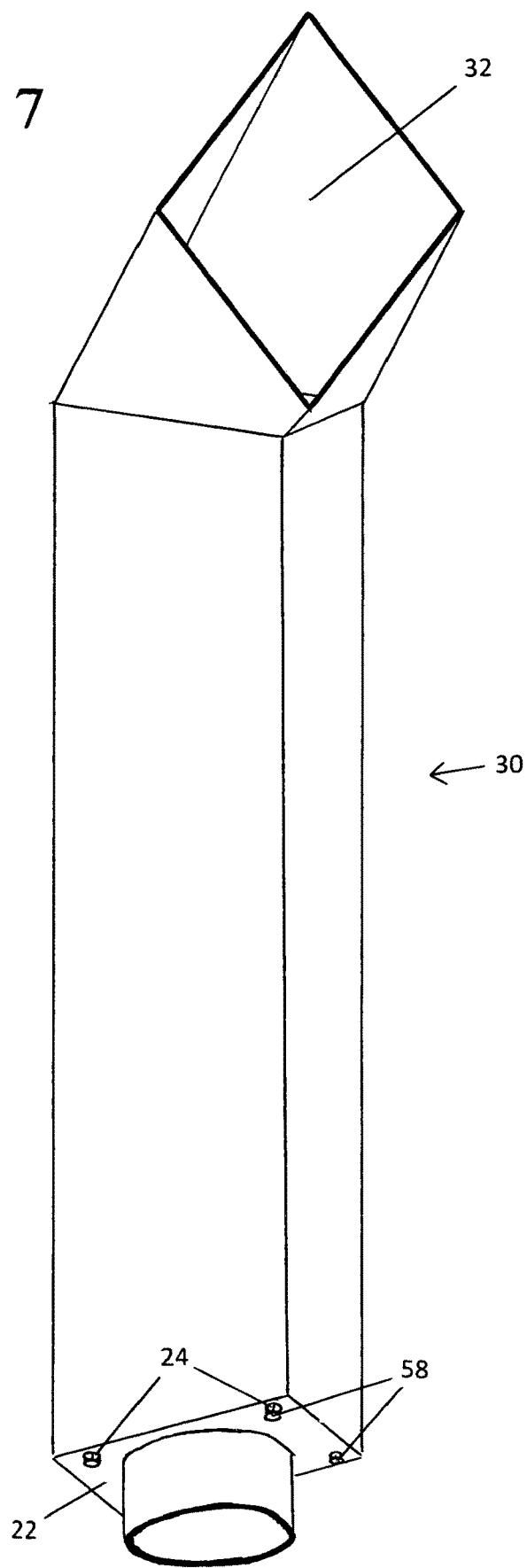
FIG. 7 is a perspective left-side and bottom view of another embodiment.

FIG. 7 is a perspective view from the user's left-side with the bottom visible and constructed in accordance with an embodiment. The embodiment in FIG. 7 is exhaust component 30 with illumination modules 58. As with the first embodiment, the exhaust component may be made with many different cross sections, orientations, sizes, materials, and finishes.

The embodiment operates the same as the first embodiment (FIG. 1) with respect to both installing exhaust component 30 on an existing exhaust pipe (not shown), and to the draft created by the exhaust flow which draws ambient air through inlet holes 24 in base 22. Ambient air traveling through the inlet holes cools the base and allow illumination modules 58 to function in close proximity to the base (FIG. 9).

Figure 8:
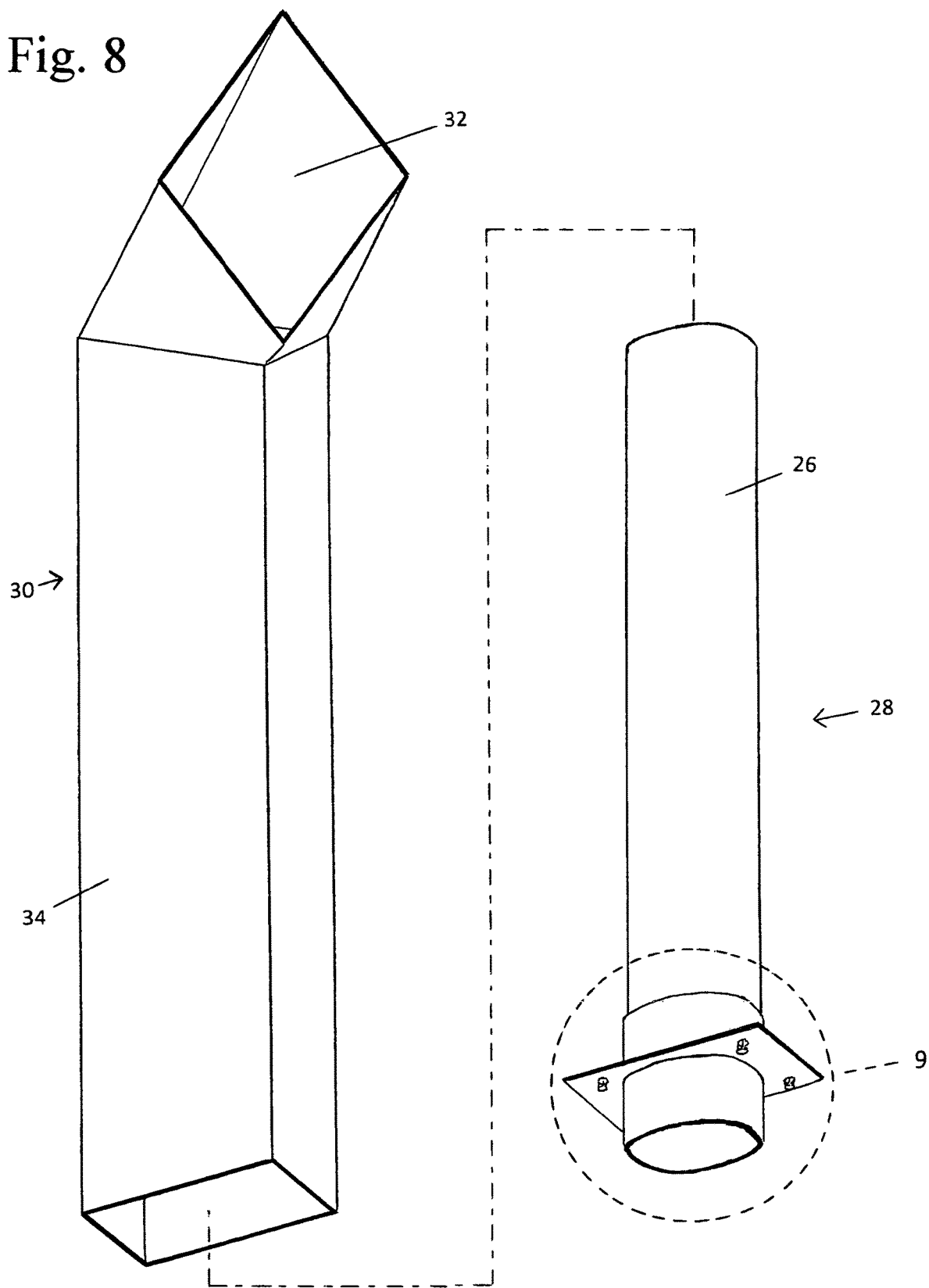
FIG. 8 is an exploded perspective left-side and bottom view of the embodiment in FIG. 7.

FIG. 8 is an exploded perspective left-side and bottom view of the embodiment in FIG. 7. This embodiment's construction is the same as the first embodiment (FIG. 2A) with respect to inner wall assembly 28 and outer wall 34.

The operation is also the same with respect to both ambient air being drawn between inner wall 26 and outer wall 34, and the cooling effect. Because the outer wall is cooled, shield 40 (FIG. 1) is not necessary to prevent the exhaust component from being touched (FIG. 7). However, the shield with illumination assembly 36 (FIGS. 2A & 2B) may be used in conjunction with illumination modules 58 for additional illuminating effect.

Figure 9:
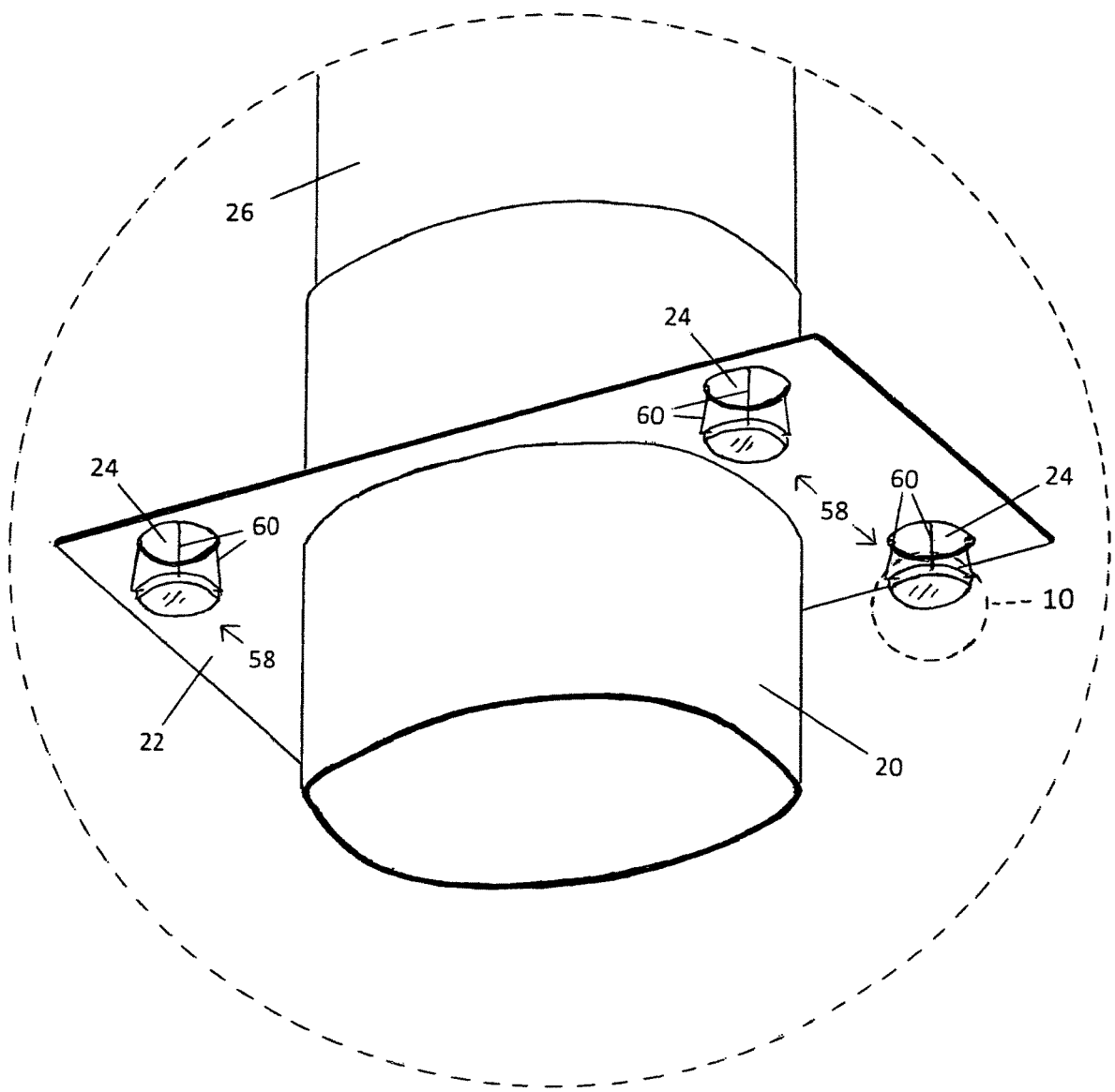
FIG. 9 is an enlarged perspective left-side and bottom view of the portion indicated in FIG. 8.

FIG. 9 is an enlarged perspective left-side and bottom view of the portion indicated in FIG. 8. The enlarged portion shows both exhaust inlet 20 protruding through base 22 and the lower portion of inner wall 26 inserted into the upper portion of the exhaust inlet. Also visible are illumination modules 58, which are hung by suspenders 60 from inlet holes 24.

Figure 10:
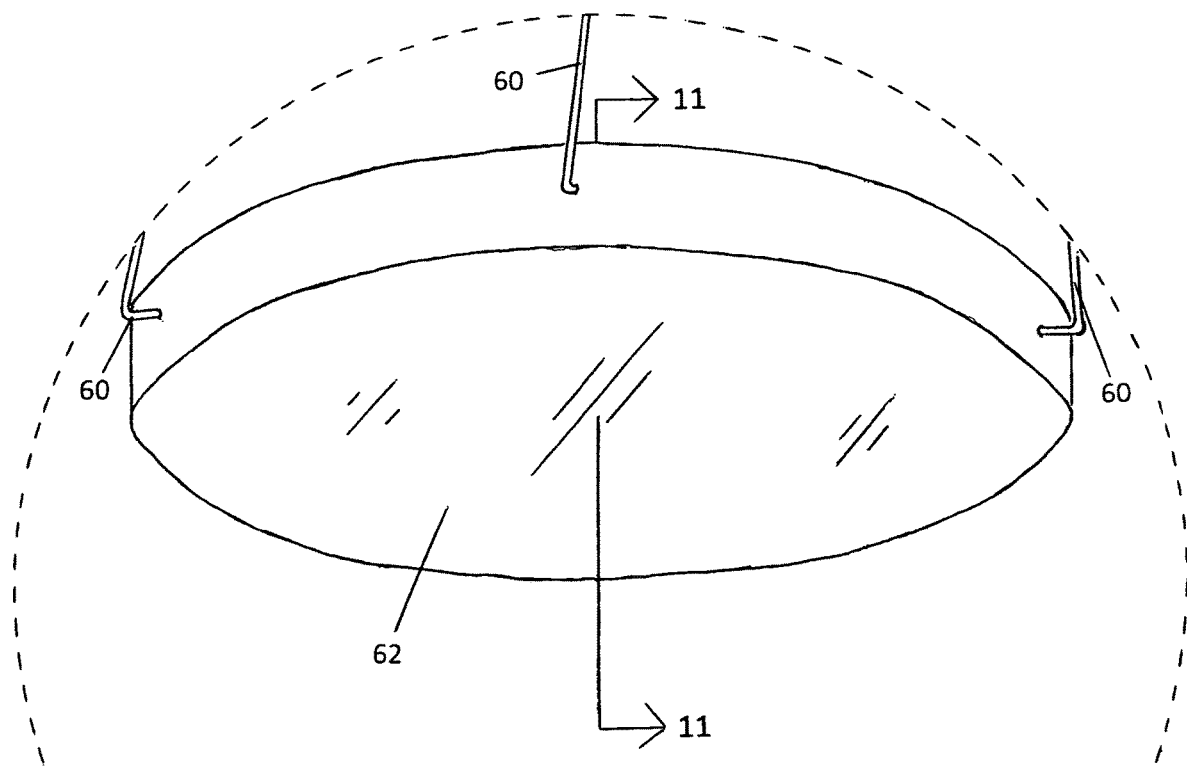
FIG. 10 is an enlarged perspective bottom view of the portion indicated in FIG. 9.

FIG. 10 is an enlarged perspective bottom view of a module base 62 and portions of suspenders 60 (as indicated in FIG. 9.).

Figure 11:
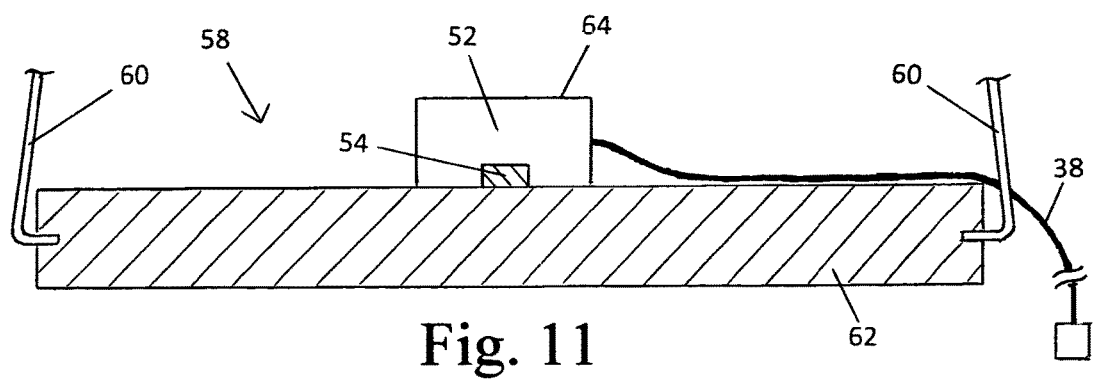
FIG. 11 is a sectional plane view of the portion indicated by section lines 11-11 in FIG. 10.

FIG. 11 is a sectional plane view of module base 62 indicated by section lines 11-11 in FIG. 10. The module base shows illuminator 54 inside cavity 52 that is created by a bezel 64, and an electrical wire and plug 38. The illuminator may be controlled by a multifunction controller (not shown). The controller may have the capability of receiving signals from the vehicle, such as turn signals, brake lights, running lights and by wire or wirelessly pass on the signal(s) to illumination module 58. The controller may also be used, by wire or wirelessly, to adjust among others: the hue, value, saturation, tint, tone, shade, and intensity of the illuminators, in addition to the creation of custom patterns.

Illumination module 58 receives power via the vehicle's electrical system (not shown) which is connected to the electrical wire and plug 38. Illuminator 54 fills cavity 52 with light, and bezel 64 focuses the light through inlet holes 24 thereby fully illuminating mouth 32 (FIG. 7).

Thus, unlike prior exhaust stacks and tips its shape becomes a design feature. Illumination of the stack's and tip's mouth both enhances the shape and allows it to remain visible under all conditions. Additionally, illumination of the mouth increases safety by making the vehicle more visible under all conditions.

FIGS. 12 THROUGH 15—ADDITIONAL EMBODIMENT

Figure 12:
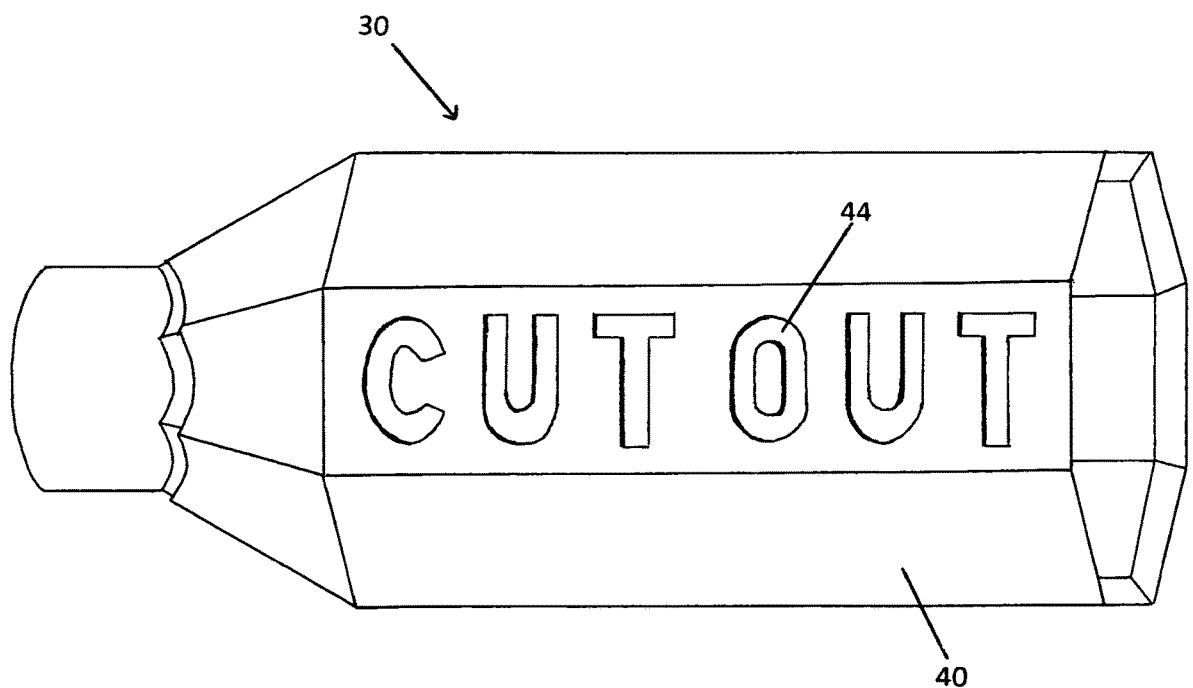
FIG. 12 is a perspective right-side and front view of another embodiment.

FIG. 12 is a perspective view from the user's right-side with the front visible and constructed in accordance with an embodiment. The embodiment in FIG. 12 is exhaust component 30 with shield 40 that has cutouts 44. As with the first embodiment the exhaust component may be made with many different cross sections, orientations, sizes, materials, and finishes.

Figure 13A:
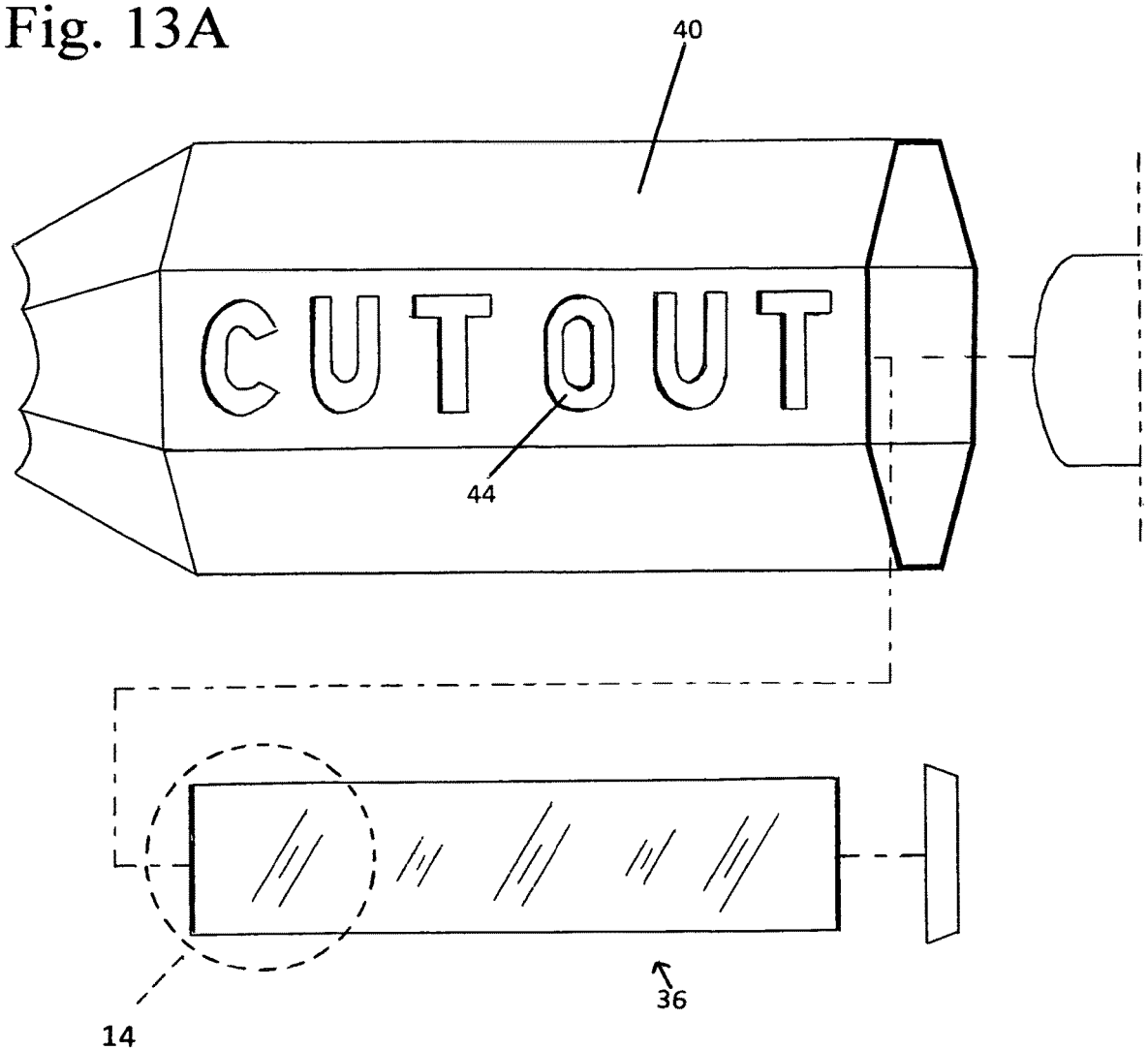
FIGS. 13A and 13B are exploded perspective right-side and front views of the embodiment in FIG. 12.
Figure 13B:
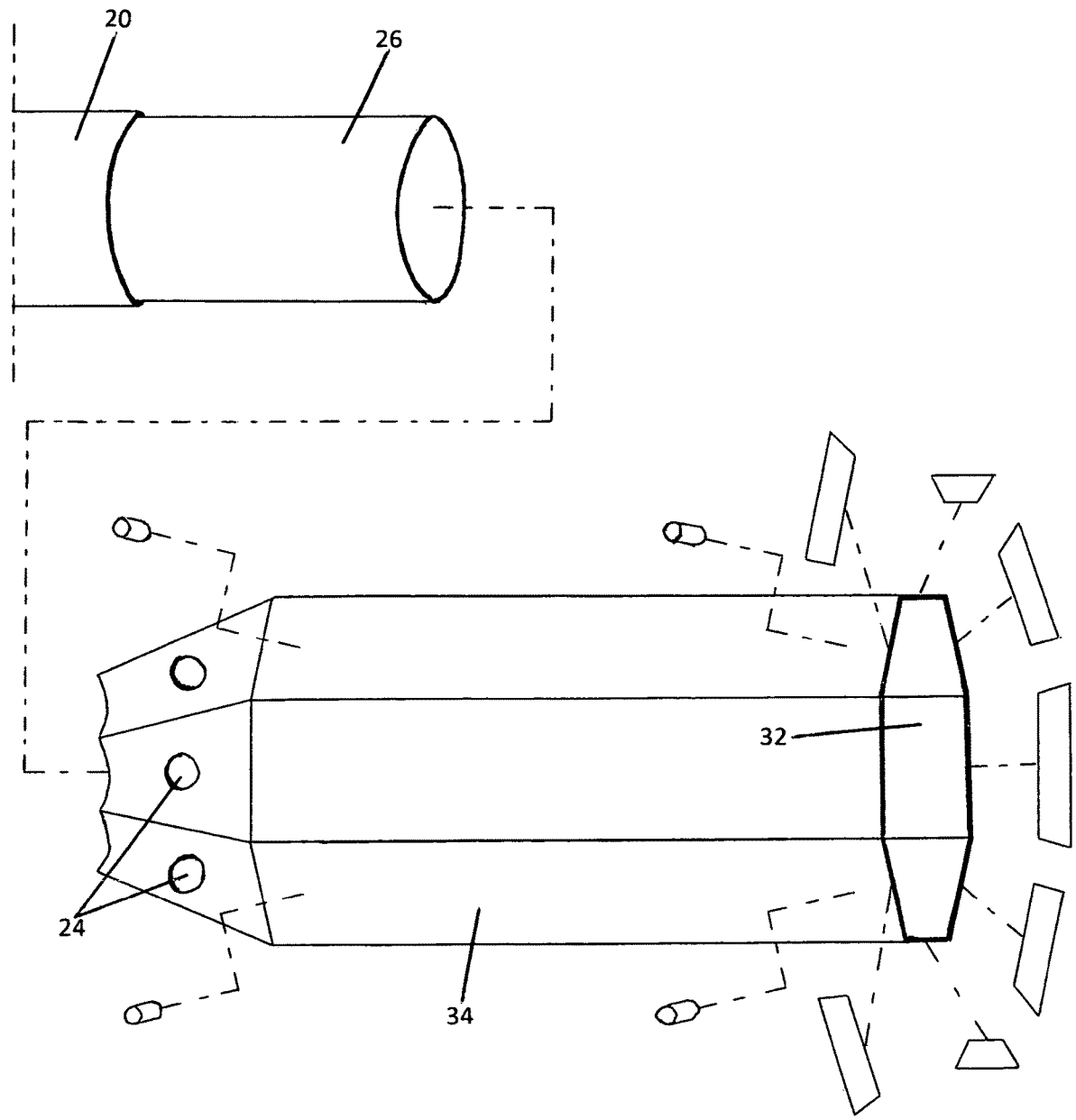

FIGS. 13A and 13B are exploded perspective right-side and front views of the embodiment in FIG. 12. The embodiment has exhaust inlet 20 protruding through outer wall 34 that has inlet holes 24. Inner wall 26 is inserted into the upper portion of the exhaust inlet and affixed. The inner wall and the exhaust inlet are inserted into the outer wall, stopping short of mouth 32 (to which it is affixed). Illumination assembly 36 is affixed behind shield 40 which has cutouts 44. The outer wall, the exhaust inlet, and the inner wall are inserted into the shield and affixed (FIGS. 13A & 13B).

The embodiment operates the same as the first embodiment (FIG. 1) with respect to both installing exhaust component 30 on an existing exhaust pipe (not shown), and to the draft created by the exhaust flow which draws ambient air through inlet holes 24 in outer wall 34. Ambient air traveling through the inlet holes cools the outer wall and allows illumination assembly 36 to function in close proximity to the outer wall (FIGS. 13A & 13B).

FIG. 14 is an enlarged view of the portion indicated in FIG. 13A. The enlarged portion shows backplate 46 encased by frame 48. Illuminators 54 are contained within the frame.

FIG. 15 is a sectional plane view of illumination assembly 36 indicated by section lines 15-15 in FIG. 14. FIG. 15 shows illuminators 54 inside cavity 52 that is created by backplate 46 and frame 48. The illuminators are enclosed in the cavity by cover 50.

Illumination assembly 36 receives power via the vehicle's electrical system (not shown). Illuminators 54 fill the cavity with light which shines through cover 50 (FIGS. 14 & 15). The illuminators may be controlled by a multifunction controller (not shown). The controller may have the capability of receiving signals from the vehicle, such as turn signals, brake lights, running lights and by wire or wirelessly pass on the signal(s) to the illumination assembly. The controller may also be used, by wire or wirelessly, to adjust among others: the hue, value, saturation, tint, tone, shade, and intensity of the illuminators, in addition to the creation of custom patterns.

Thus, unlike prior exhaust stacks and tips, cutouts 44 in shield 40 are enhanced by illumination which also allows them to remain visible under all conditions. Additionally, illumination of the shield's cutouts increases safety by making the vehicle more visible under all conditions.

CONCLUSION, RAMIFICATION, AND SCOPE

Thus, the reader will see that at least one embodiment of the exhaust component with illumination provides improved design features which are enhanced by illumination. The improvements are more aesthetically pleasing over prior art and add additional visibility under all conditions of both the design feature and of the vehicle the exhaust component is installed on.

While the above description contains many specificities, these should not be construed as limitations on the scope, but rather as an exemplification of one or several embodiments thereof. Many other variations are possible. The exhaust component with illumination can be used in applications other than the terminal exhaust component of a vehicle. For example, the illuminated shield could be placed on exhaust manifolds, mufflers, or the pipe itself. It could also be used on the air intake of a vehicle, such as the air filter, intake manifold, or intake pipes. In addition, it could be used on water lines, building exhaust, the exhaust and air intakes of boats or trains.

Accordingly, the scope should be determined not by the embodiments illustrated, but by the appended claims and their legal equivalents.

The invention claimed is:

1. An exhaust component with illumination comprising:
    a. an exhaust inlet of predetermined size to be connected to an exhaust system,
    b. an elongated outer wall with one end remaining open forming a mouth to allow exhaust to exit,
    c. a shield containing at least one cutout as a design feature,
    d. an illumination assembly for illuminating said cutout,
    e. means for joining said outer wall to said exhaust inlet, means for mounting said illumination assembly to said shield, and means for connecting said shield to said outer wall,
whereby said design feature is enhanced and remains visible under all conditions.

2. The exhaust component with illumination of claim 1, further comprising:
    a. an inner wall,
    b. a predetermined number of inlet holes to allow ambient air to travel between said outer wall and said inner wall to cool said outer wall, and
    c. means for connecting said inner wall to said exhaust inlet.

3. The exhaust component with illumination of claim 2, further comprising means for controlling said illumination assembly.

4. The exhaust component with illumination of claim 1, further comprising a heat resistant coating on said illumination assembly to reduce the transfer of heat.

5. The exhaust component with illumination of claim 4, further comprising means for controlling said illumination assembly.

6. The exhaust component with illumination of claim 1, further comparing means for controlling said illumination assembly.

7. The exhaust component with illumination of claim 1, wherein: the shape of the cross section of said outer wall comprises oval, circular, triangular, diamond, square, rectangular, pentagonal, hexagonal, octagonal; the angle of said mouth comprising 30°, 60°, 90°, 180°; said outer wall can be made of materials comprising carbon steel, stainless steel, aluminum, polycarbonate, fiberglass, kevlar, carbon fiber; the finish of said outer wall comprises high-temperature paint, powder coat, chrome, polished; the design of said cutout comprises letters, logos, symbols, pictures; and the illuminators of said illumination assembly comprise incandescent lights, fluorescent lights, neon lights, light emitting diodes, liquid crystal display, electroluminescent.

8. The exhaust component with illumination of claim 7, further comprising:
    a. an inner wall,
    b. a predetermined number of inlet holes to allow ambient air to travel between said outer wall and said inner wall to cool said outer wall, and
    c. means for connecting said inner wall to said exhaust inlet.

9. The exhaust component with illumination of claim 8, further comprising means for controlling said illumination assembly.

10. The exhaust component with illumination of claim 7, further comprising a heat resistant coating on said illumination assembly.

11. The exhaust component with illumination of claim 10, further comprising means for controlling said illumination assembly.

12. The exhaust component with illumination of claim 7, further comprising means for controlling said illumination assembly.

13. An exhaust component with illumination comprising:
   a. an exhaust inlet of a predetermined size to be connected to an exhaust system,
   b. an inner wall,
   c. an elongated outer wall, one end remaining open forming a mouth to allow exhaust to exit, and said mouth containing a shape as a design feature,
   d. a predetermined number of inlet holes to allow ambient air to travel between said outer wall and said inner wall to cool said outer wall,
   e. at least one illumination module for illuminating said design feature from the outside of said outer wall through said inlet holes, and
   f. means for connecting said inner wall to said exhaust inlet, means for joining said outer wall to said exhaust inlet, and means for mounting said illumination module to said inlet holes, whereby said design feature is enhanced and remains visible under all conditions.

14. The exhaust component with illumination of claim 13, further comprising means for controlling said illumination module.

15. The exhaust component with illumination of claim 13, wherein: the shape of the cross section of said outer wall comprises oval, circular, triangular, diamond, square, rectangular, pentagonal, hexagonal, octagonal; the angle of said mouth comprising 30°, 60°, 90°, 180° said outer wall can be made of materials comprising carbon steel, stainless steel, aluminum, polycarbonate, fiberglass, kevlar, carbon fiber; the finish of said outer wall comprises high-temperature paint, powder coat, chrome, polished; the design of said mouth comprising that of said cross section; and the illuminators of said illumination module comprise incandescent lights, fluorescent lights, neon lights, light emitting diodes, liquid crystal display, electroluminescent.

16. The exhaust component with illumination of claim 15, further comprising means for controlling said illumination module.

17. An elongated component with illumination comprising:
   a. an inlet of predetermined sized to be fastened to a preexisting structure,
   b. an elongated component,
   c. a shield containing at least one cutout as a design feature,
   d. an illumination assembly for illuminating said cutout,
   e. means for connecting said inlet to said preexisting structure, means for joining said inlet to said elongated component, and means for mounting said illumination assembly to said elongated component, whereby said design feature is enhanced and remains visible under all conditions.

18. The elongated component with illumination of claim 17 further comprising a heat resistant coating on said illumination assembly to reduce the transfer of heat.

19. The elongated component with illumination of claim 17, wherein the shape of the cross section of said elongated component comprises oval, circular, triangular, diamond, square, rectangular, pentagonal, hexagonal, octagonal; said elongated component can be made of materials comprising carbon steel, stainless steel, aluminum, polycarbonate, fiberglass, kevlar, carbon fiber; the finish of said elongated component comprises paint, high-temperature paint, powder coat, chrome, polished; the design of said cutout comprises letters, logos, symbols, pictures; and the illuminators of said illumination assembly comprise incandescent lights, fluorescent lights, neon lights, light emitting diodes, liquid crystal display, electroluminescent.

20. The elongated component with illumination of claim 19 further comprising a heat resistant coating on said illumination assembly to reduce the transfer of heat.

* * * * *